No. 690,531. Patented Jan. 7, 1902.
A. D. SMITH.
VEHICLE WHEEL.
(Application filed Oct. 19, 1901.)
(No Model.)
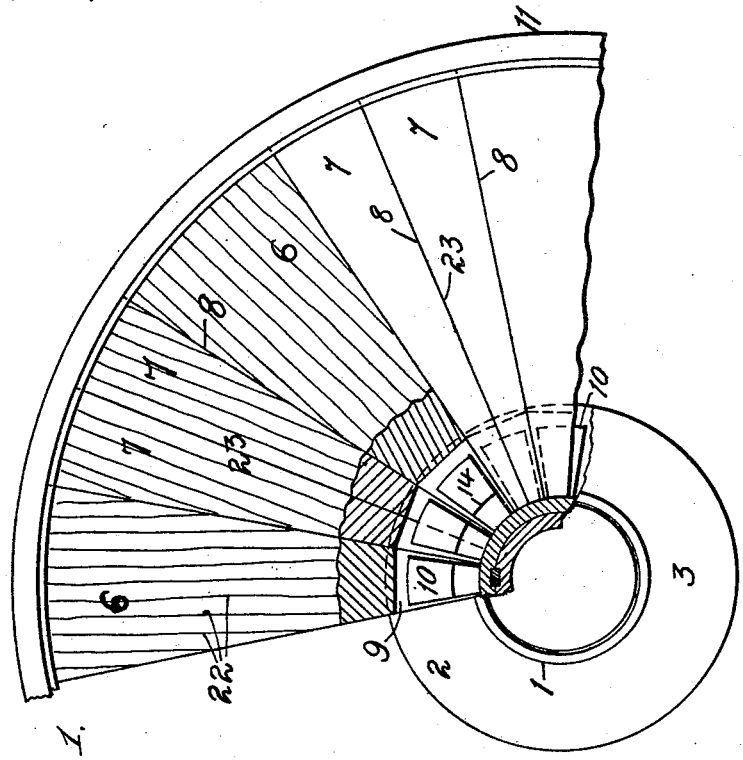
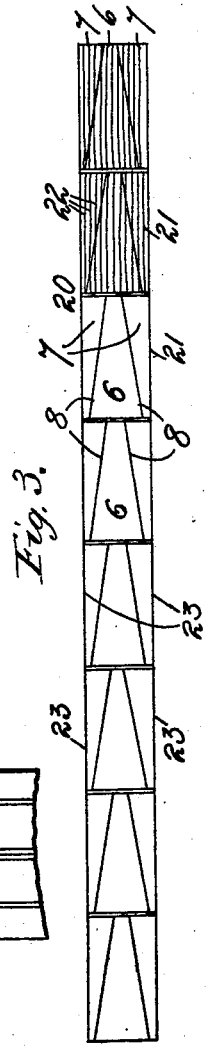
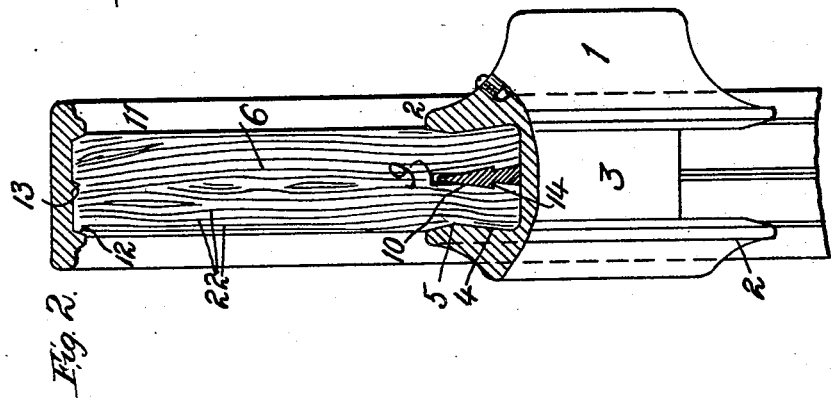
THE NORRIS PETERS CO., PHOTO-LITHO., WASHINGTON, D. C.

UNITED STATES PATENT OFFICE.

ALLISON DALRYMPLE SMITH, OF EDINBURGH, SCOTLAND.

VEHICLE-WHEEL.

SPECIFICATION forming part of Letters Patent No. 690,531, dated January 7, 1902.

Application filed October 19, 1901. Serial No. 79,216. (No model.)

*To all whom it may concern:*

Be it known that I, ALLISON DALRYMPLE SMITH, a subject of the King of Great Britain, and a resident of Edinburgh, in the county of Mid-Lothian, Scotland, have invented certain new and useful Improvements in Vehicle-Wheels, of which the following is a specification.

In order to render the description of my invention clearer, I have appended hereto a sheet of drawings showing how my invention is to be or may be carried into effect.

In the said drawings, Figure I is a side elevation, partly in section, of a part of a wheel of the closed type constructed according to my invention. Fig. II is a partial cross-section through the wheel, part of the hub being shown in elevation; and Fig. III is a diagram illustrating my method of obtaining parallel grain in the spoke-segments.

Referring to Figs. I and II, 1 is a metal hub provided with circular side flanges 2, forming between them a circular channel 3 all around the hub. These flanges are so constructed that the channel is at the part 4, nearest the center of the hub, wider than it is at another part 5, farther out. This channel is formed to receive the segments of two forms, (marked, respectively, 6 and 7,) of which the wheel is built up. These segments are cut to such an angle that their edge surfaces 8 form radii of the wheel-circle. A saw-cut 9 is made for a short distance up the inner end of each segment in the plane of rotation of the wheel, and wedges 10, of metal, hard wood, or other suitable materials, are slightly inserted in the said saw-cuts. These are preferably of the shape shown in Figs. I and II. The segments are then assembled with the hub in a circular hydraulic wheel-press, their inner ends being placed in position to enter the circular grooves, hereinbefore described, and by the application of the hydraulic pressure they are forced together toward the center. As the action of the press forces the segments inward the butt-ends of the iron wedges encounter the metal of the hub, and thus cease traveling with the segment, which is then forced over the said wedges and compressed with them within the groove. When this operation is completed, the partly-formed wheel is removed from the press and the outer ends of the segments are trimmed off to have a truly-circular periphery.

The steel tire 11 is recessed at 12 to receive the outer ends of the segments and is of sufficient diameter to pass freely over the outer circumference of the assembled segments. It is placed around the wheel and then compressed by means of a hydraulic or other tire-press until it is diminished in diameter and all the parts are pressed firmly together. The tire has an annular wedge-shaped projection 13 inside in order to still further strengthen the hold of the tire on the segments when these are forced into it.

I have hereinbefore spoken of the wedges as being "loose;" but it is obvious that they might be integral with the hub. I, however, prefer to employ loose wedges, as they then act not merely as "wedges," properly so called, but also as devices which, for convenience, I may term "following" devices. Thus let us assume that the tire were to come off and no longer restrain the spoke-segments from coming out of the hub and that there was a force applied tending to withdraw the said spoke-segments from the said groove. In such event the loose wedges would tend to follow the spoke-segments and tend to bring a wider part of the wedge to the narrower part of the groove. The tendency to remove the spoke-segments from the groove would therefore be counterbalanced by the tendency of the following device to jam, and as a result no movement under ordinary circumstances would take place.

In Fig. III I show a method of obtaining parallel grain in the segments, it being desirable to have the grain running as nearly as possible in a radial direction in the wheel, and it is to be noted that my method of obtaining parallel grain effects a great saving in the wood from which the segments are cut. A plank 20 is cut crosswise into pieces 21 equal in length to that of the segments required. Each piece is then cut along two diagonal lines at such an angle that these lines 8 form radii of the circle when the segments 6 are placed in position as shown in Fig. I. By suitably spacing these lines the two pieces 7 7 are made together equal to the piece 6, and when placed side by side in the wheel, with their outer edges 23 in contact, the grain of one is brought parallel to that of the other and they fill a space of the same shape and size as one central piece 6. The lines 22 in Figs. I, II, and III indicate approximately the grain of the timber.

Any other suitable form of tire may be substituted for that hereinbefore mentioned.

Having thus described my invention, what I claim as new, and desire to secure by Letters Patent, is—

1. In a vehicle-wheel, a series of segmental sections or spokes, alternate sections being formed of a single piece having its edges cut diagonally across the grain of the wood, and the remaining sections formed of two pieces turned side by side to present the grain in the same relationship as in the single-piece sections, said two pieces and the diagonal single section being cut from a single rectangular section of wood, in combination with a hub wherein the bases of the sections are adapted to enter, said bases being transversely slitted, and a wedge adapted to enter the slit in the base of each section to expand said base into locking engagement with the hub.

2. In a vehicle-wheel, a series of segmental sections or spokes, alternate sections being formed of a single piece having its edges cut diagonally across the grain of the wood and the remaining sections formed of two pieces turned side to side to present the grain in the same relationship as in the single-piece sections, said two pieces and the diagonal single section being cut from a single rectangular section of wood.

In witness whereof I have hereunto set my hand in presence of two witnesses.

ALLISON DALRYMPLE SMITH.

Witnesses:
   GEO. J. W. FRANKLIN,
   WALTER J. SKERTEN.